United States Patent
Kramer et al.

(10) Patent No.: US 6,803,851 B1
(45) Date of Patent: Oct. 12, 2004

(54) METHOD FOR CARRYING OUT A KEYLESS ACCESS AUTHORIZATION CHECK AND KEYLESS ACCESS AUTHORIZATION CHECK DEVICE

(75) Inventors: Detlev Kramer, Schwerte (DE); Volker Pretzlaff, Iserlohn (DE); Rainer Vens, Dortmund (DE); Paul Vogels, Dortmund (DE); Michael Fromm, Dortmund (DE); Dirk Wolf, Dortmund (DE); Peter Raab, Hagen (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 09/763,441
(22) PCT Filed: Aug. 19, 1999
(86) PCT No.: PCT/EP99/06072
§ 371 (c)(1), (2), (4) Date: Apr. 12, 2001
(87) PCT Pub. No.: WO00/12848
PCT Pub. Date: Mar. 9, 2000

(30) Foreign Application Priority Data

| Sep. 1, 1998 | (DE) | 198 39 695 |
| Sep. 1, 1998 | (DE) | 198 39 696 |
| Jun. 10, 1999 | (DE) | 199 26 234 |

(51) Int. Cl.$^7$ ............ G05B 19/00; G06F 7/00; G08B 29/00; H04B 1/00; H04Q 9/00
(52) U.S. Cl. .......... 340/5.61; 340/5.64; 340/825.69
(58) Field of Search ............ 340/825.69, 825.72, 340/426, 428, 5.61, 5.64, 825.7, 825.71–825.78; 455/151.2, 34.3; 341/176, 23

(56) References Cited

U.S. PATENT DOCUMENTS

| 4,454,512 A | 6/1984 | Millett |
| 4,725,841 A * | 2/1988 | Nysen et al. ........ 342/44 |
| 5,293,160 A | 3/1994 | Kurozu et al. |

(List continued on next page.)

FOREIGN PATENT DOCUMENTS

| DE | 44 09 167 C1 | 6/1995 |
| DE | 43 29 697 C2 | 10/1995 |
| DE | 44 40 855 A1 | 5/1996 |
| DE | 43 06 819 C2 | 8/1996 |
| DE | 195 33 125 C1 | 1/1997 |

(List continued on next page.)

OTHER PUBLICATIONS

Merrill, I. Skolnik, Introduction To Radar Systems, International Student Edition, Second Edition, ©1981, pp. 80–87, McGraw-Hill International Book Co.

Primary Examiner—Michael Horabik
Assistant Examiner—Nam Nguyen
(74) Attorney, Agent, or Firm—Brooks Kushman P.C.

(57) ABSTRACT

A method and device for checking keyless vehicle access authorization of an operator. The method includes transmitting a code signal from a base station to a mobile identification (ID) transmitter carried by the operator. In response to receiving the code signal, the ID transmitter performs an action which is indicative of a reply signal that is detectable by the base station. The difference of a signal characteristic between a reference code signal monitored at the base station and the reply signal received by the base station is then determined. The signal characteristic correlates with signal propagation time and changes as a function of the distance between the base station and the ID transmitter. The distance between the base station and the ID transmitter is then determined on the basis of a relative determination based on the difference of the signal characteristic between the reference code signal and the reply signal.

26 Claims, 7 Drawing Sheets

U.S. PATENT DOCUMENTS

| | | | | |
|---|---|---|---|---|
| 5,396,510 A | * | 3/1995 | Wilson | 356/28 |
| 5,432,516 A | | 7/1995 | Cherry et al. | |
| 5,723,911 A | | 3/1998 | Glehr | |
| 5,983,347 A | * | 11/1999 | Brinkmeyer et al. | 340/5.62 |
| 6,087,987 A | * | 7/2000 | Bachhuber et al. | 342/457 |

FOREIGN PATENT DOCUMENTS

| | | |
|---|---|---|
| DE | 196 32 025 A1 | 4/1998 |
| DE | 197 18 764 C1 | 8/1998 |
| EP | 0 848 123 A2 | 6/1998 |
| WO | WO 91/10919 | 7/1991 |

* cited by examiner

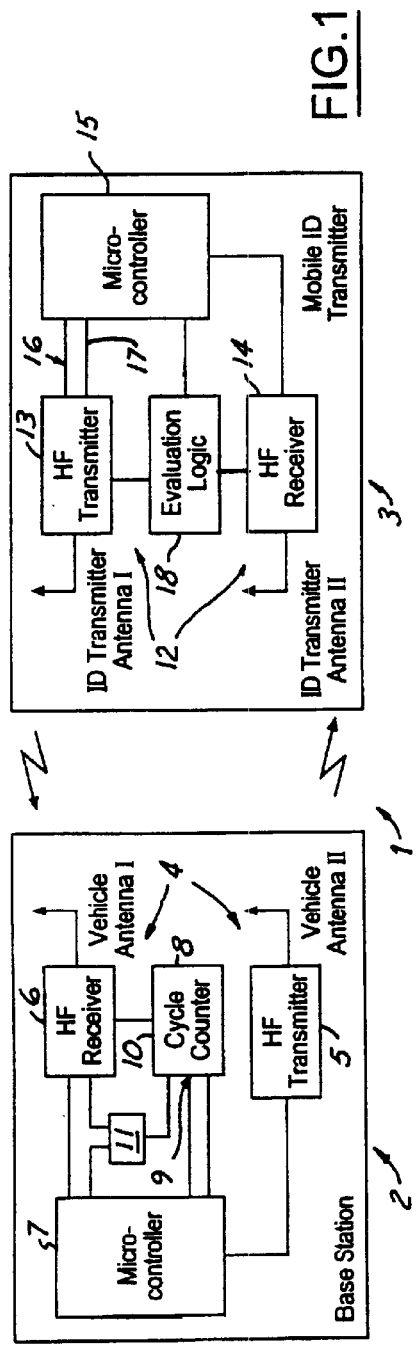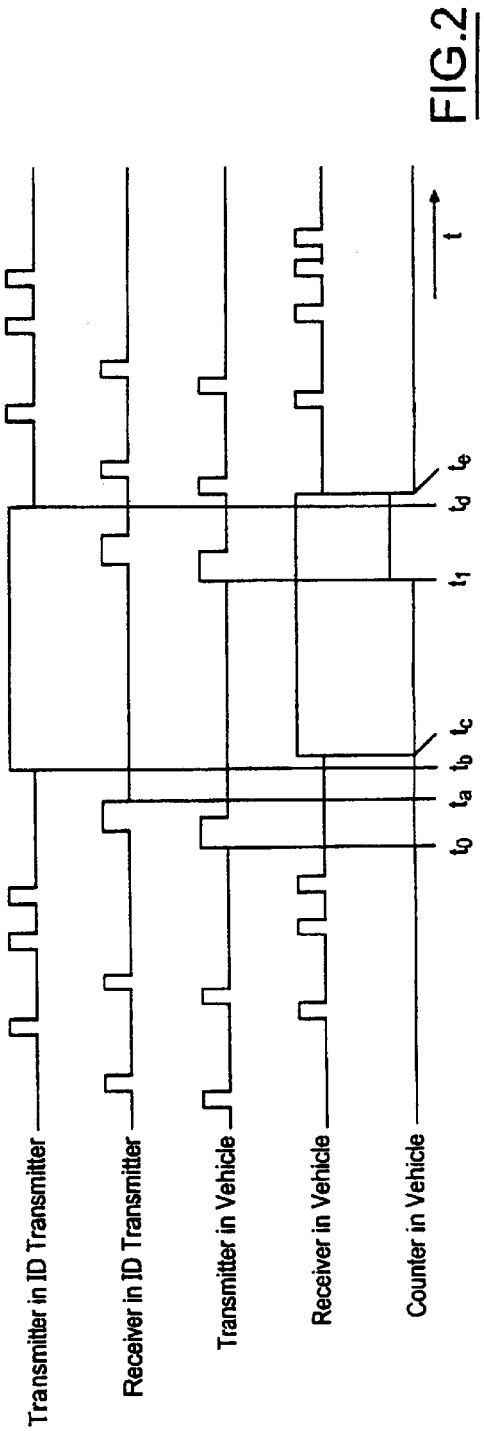

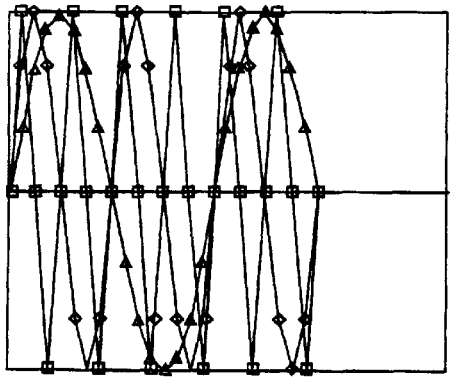
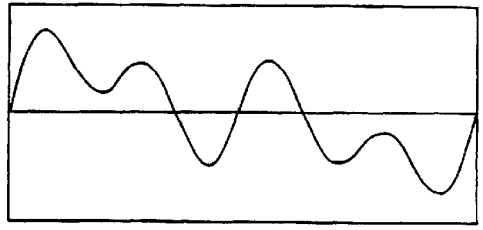
FIG.9b
- Base Frequency
- Base Frequency/2
- Base Frequency/4
FIG.9a
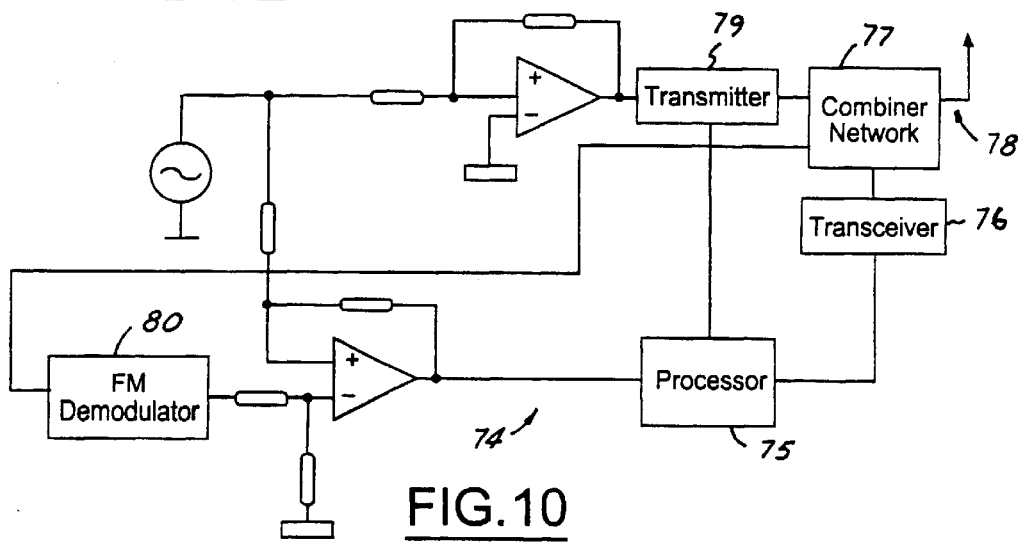
FIG.10
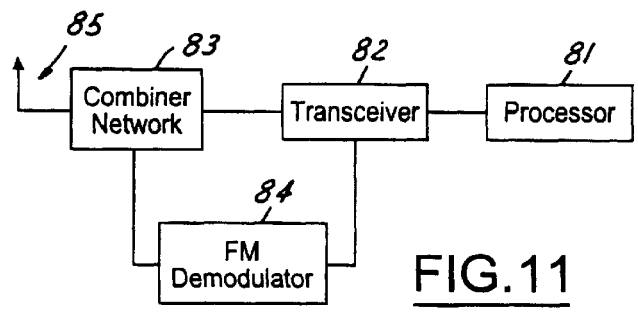
FIG.11

METHOD FOR CARRYING OUT A KEYLESS ACCESS AUTHORIZATION CHECK AND KEYLESS ACCESS AUTHORIZATION CHECK DEVICE

TECHNICAL FIELD

The invention pertains to the field of carrying out keyless access authorization control for checking, for example, whether a person is authorized to perform a certain action, such as opening a vehicle door. In particular, the invention pertains to a method for carrying out keyless access authorization control by means of wireless communication between a transceiver unit corresponding to a base station and a mobile identification transmitter (ID transmitter) in order to check the access authorization of the person carrying the ID transmitter. The method includes: transmitting a code signal from the transceiver unit of the base station, receiving this code signal by the ID transmitter, carrying out an action that can be detected by the transceiver unit and that is executed by the ID transmitter at the receipt of the code signal as a reply signal of the ID transmitter, and detecting the action of the ID transmitter and determining the distance between the base station and the ID transmitter.

The invention also pertains to a keyless access authorization control device with a base station featuring a transceiver unit as well as a control and evaluation element and a mobile identification transmitter (ID transmitter) featuring a transceiver unit for checking the access authorization of the person carrying the ID transmitter. This base station can calculate the distance from the base station to the ID transmitter.

BACKGROUND ART

Keyless locking systems are used in numerous applications, for example, in vehicles to increase user convenience. Conventionally, infrared and radio systems are used as remote-control systems wherein the authorized user activates the ID transmitter in order to transmit a signal to the base station, for example, to a receiver unit in a vehicle for opening the vehicle. To further increase user convenience, passive access authorization control systems can be used as the user passes between vehicles, so that an authorized user carrying a valid ID transmitter can open his vehicle without having to actively turn on the ID transmitter. Such a keyless access authorization control device is described, for example, in DE 43 29 697 C2. In the method disclosed in this document, a code signal is transmitted from a transceiver unit in a vehicle, and this signal is received by the ID transmitter when the transmitter is within the reception area of this signal. Then, a reply signal is sent back from the ID transmitter due to the action triggered by the receipt of the code signal. The validity of the reply signal is checked after it is received by the receiver unit of the vehicle. The receipt of a valid reply signal triggers the desired action in the vehicle, namely unlocking the vehicle doors. This passive system is problematic in that the transmission path between the base station and the ID transmitter can be extended by simple means that are unauthorized and unnoticeable to the authorized user. In this way, an unauthorized person can establish radio connection between the transceiver unit of the vehicle and the ID transmitter authorized for opening, even if the latter is not within the reception area of the request signal. Thus, the unauthorized person can gain unknown entry to the vehicle.

The object of DE 196 32 025 A1 addresses this problem. In the keyless access authorization control device described in this document, detection of the propagation time relative to the transmitted request signal and the received reply signal is carried out, in which the corresponding time span required by the transmitted code signal to be transmitted from a base station and then received as a reply signal is calculated. If the transmission path has been lengthened, then the time interval from the transmission of the code signal to the receipt of the reply signal is naturally greater than when the ID transmitter is definitely in the direct vehicle proximity and the corresponding return radio path is short. If the calculated signal propagation time exceeds a predefined value, the access authorization control method is stopped in order to prevent unauthorized entry.

In order to carry out the access authorization control method described in this document, it is necessary to detect the signal propagation time with high accuracy. Communication between the transceiver unit and the mobile ID transmitter is typically within a very limited area around the base station: for vehicles, an area between 5 and 10 m e.g. The propagation time of an ordinary transmitted and received signal within this distance is between 16.5 ns and 33 ns. The detection of such short time spans, in particular with the desired resolution, is only possible with significant expense, an expense that is not justifiable for numerous applications, for example, for a vehicle.

SUMMARY OF THE INVENTION

Starting with the previously discussed prior art, the task of the invention is based on proposing such a method for carrying out keyless access authorization control that not only features sufficient security relative to the possibility of detecting a manipulated path extension, but that can also be realized with the use of simple means.

The task of the invention is also based on proposing such a keyless access authorization control device that can detect a (manipulated) path extension with the use of justifiable means.

The task related to the method is solved according to the invention in that the distance determination is done based on a relative determination, in which the difference of a distance-dependent signal characteristic correlated with the signal propagation time between a reference code signal monitored in the base station and the reply signal received by the transceiver is evaluated.

The knowledge of the claimed invention is based on the fact that it is possible to determine distance with sufficient resolution over indirect paths by detecting a signal value correlated with the propagation time of a signal using simple means. In contrast to the previously known method, this distance determination is done by means of a relative determination, in which a reference code signal is monitored in the base station with reference to the transmitted signal characteristic and the signal characteristic of this reference code signal is compared with the signal characteristic of the reply signal returned by the ID transmitter and received by the transceiver unit. The distance-dependent signal characteristic to be compared with the reference code signal gives information about the return path of the code signal and reply signal when compared with the corresponding reference code signal. In this way, the reference code signal, for example, the transmitted code signal, can be monitored during the transmission period of the code signal by the base station. The detection by the base station of the actions executed by the ID transmitter is limited by the measurement time distance. These actions can be, for example, the return transmission of the code signal received by the ID transmitter. The actions executed by the ID transmitter can also be other actions that can be detected by the base station, such as the shutdown of a transmitter and thus the detection by the base station of the time when such a transmitter is turned off by the ID transmitter. The use of hardware to carry out such a relative distance determination is very minimal in comparison with that required to carry out an absolute propagation time measurement. Depending on the method used, numerous evaluation steps can also be eliminated during data processing.

Starting with the background of this embodiment and the description of the invention, either the delay times by the circuit elements used are much shorter relative to the actual signal propagation time or they are known, or they are calculated and taken into consideration in the evaluation.

To carry out such a relative distance determination, different signal characteristics can be used. For example, counting the cycles of the carrier wave of the transmitted code signal over a time period until, for example, a reply signal has been received by the transceiver unit can be done in the base station. The number of cycles counted in the base station over the time until the detection of the performed action, for example, the return transmission of the received code signal, multiplied by the period of the carrier wave gives the propagation time of the signal from the base station to the ID transmitter and back. The distance between the base station and the ID transmitter is then given by half the signal propagation time multiplied by the speed of light. Thus, the propagation time cannot be detected in continuous increments, but rather in multiplies of the period. Using a carrier frequency of 100 MHz, for example, the resulting distance determination between the base station and the ID transmitter has a resolving power of approximately 1.5 m. Using a carrier wave in an ISM band, with an approximate frequency of 434 MHz, a resolving power of approximately 0.35 m can be achieved due to the correspondingly smaller period.

To realize the method according to the invention using this configuration, electronic components that are otherwise used to perform authorization requests can be used. Additional requirements are merely the use of a counter that can be designed, for example, out of logic gates or flip-flops. Thus, the method according to the invention can be realized without great additional expense.

Expediently, the wireless communication is performed in a frequency distance within an ISM band. The resolving power of the distance determination during use of such a frequency is considerably higher than that required for the use of such a method for keyless access authorization control for a vehicle. The resolving power for using such a method for vehicles is on the order of 5–10 m. Due to the minimal resolving power required in such an application, compared with the possible resolving powers, the requirements on the counter can be lessened such that not every cycle, but rather every xth, or approximately every $2^x$th cycle, is counted. Such selective cycle counting can be realized through the use of a frequency divider or a frequency mixer, so that for a dividing ratio of 1:16, only every 16th cycle is counted. Using a frequency of 434 MHz and a dividing ratio of 1:16 results in a counting frequency of 27.125 MHz and consequently a resolving power of approximately 5.5 m; a resolving power that is sufficient for using the method for vehicles, relative to distance determination.

In a refinement of this embodiment, the command TRANSMITTER ID TRANSMITTER ON is transmitted by the transceiver in a first step for distance determination. Based on this command, a transmitter is turned on in the ID transmitter in order to transmit at a first frequency. After a predetermined length of time that is sufficient for the transmitter of the ID transmitter to have transmitted, a code signal is transmitted at a second frequency by the transceiver unit of the base station. This code signal is the command TRANSMITTER ID TRANSMITTER OFF. Simultaneous with the transmission of the command, the cycle count of the carrier wave of this transmission signal begins. Beforehand, the receiver channel of the transceiver unit is switched to the first frequency so that the signal transmitted by the ID transmitter can be received. The cycle count is stopped when the transmission signal of the ID transmitter can no longer be detected by the transceiver unit of the base station. Thus, the cycle count is performed for a length of time necessary for the propagation time of the code signal from the base station to the ID transmitter and back. The action signal of the ID transmitter detected by the base station is the reaction of the ID transmitter to the transmitted code signal.

In another configuration of this embodiment, the code signal transmitted by the base station is returned by the ID transmitter in a mirror-like fashion. In this embodiment, the cycle count is stopped when the code signal as the reply signal of the ID transmitter has been completely received again by the transceiver unit of the base station. In another embodiment, in order to be able to compensate for possible data loss during data transmission, two cycle counters are assigned in the base station, wherein a first cycle count is coupled to the transmission of the code signal and another cycle count is coupled to the receipt of the code signal reflected by the ID transmitter. The cycle count of the second counter coupled to the receipt of the code signal is stopped when the counter associated with the transmission of the code signal reaches a count that corresponds to twice the number of cycles corresponding to the code signal. The greater the distance between the base station and the ID transmitter, and correspondingly, the longer the signal propagation time, the larger is the difference between the calculated counter status associated with the receipt of the code signal and the number of cycles corresponding to the code signal. For the last two examples, it is expedient to transmit a predetermined number of cycles of a carrier wave.

Another embodiment of the invention takes advantage of the fact that the phase of a wave transmitted over a radio path is shifted depending on the return radio path relative to the originally transmitted phase. In this way, both the phase of the frequency and also the amplitude variation (envelope) can be used individually or together in order to compare the phase of the transmitted request signal with the corresponding reply signal returned by the ID transmitter. In this way, the reply signal is transmitted from the ID transmitter to the transceiver of the base station using a carrier wave. The carrier wave can be a wave within the reply signal, for example, the request signal itself, or it can be transmitted to the ID transmitter by modulating a carrier wave for transmitting the request signal. If the ID transmitter is located within the predetermined receive area of the transmitted request signal, which is less than 3 m for the application of the method to the automotive field, the return path (transceiver unit-ID transmitter-transceiver unit) is short. The phase shift between the demodulated reply signal and the originally transmitted request signal is so small that it can be produced within a predetermined tolerance distance of phase-locked signals (request signal and reply signal). For a manipulated path extension, the phase between request signal and reply signal is constantly shifted, so that this is outside the tolerance distance of the operation defined as phase-locked. The probability of the received and demodulated reply signal having a phase corresponding to the respective request signal is purely random and thus it is extremely small. Consequently, the desired action, like the opening of a vehicle, is only performed when the ID transmitter is at the predetermined distance to the base station.

To prevent undesired feedback, the request signal is expediently transmitted at a different frequency than the reply signal. In an especially simple configuration, the request signal is transmitted at the frequency for modulating the reply signal. This can be realized so that, for example, the request signal is transmitted on a low-frequency channel and this request signal received by the ID transmitter is used to directly modulate a carrier wave on a high-frequency channel. For example, a request signal can be a wake signal transmitted on an LF channel for switching the ID transmitter from quiet or sleep mode to active mode.

To further increase access security, the oscillator for transmitting the request signal is operated in a free-running manner, so that it produces known deviations in frequency. In addition, the transmission frequency can be changed according to a predetermined variation pattern so that the chance of realizing an unauthorized and yet phase-locked path extension is even further reduced.

In another configuration of this embodiment, a modulated carrier wave with a modulation scheme of one or more modulation variables is transmitted as a request signal by the transceiver unit. In this way, either a modulation scheme of different frequencies or different amplitudes or even a scheme of these two values is used. After receipt of the reply signal modulated in this way, filtering relative to the original modulation scheme components, for example, the individual frequency components, is performed after demodulation of the reply signal. The subsequent step of the phase comparison of the originally transmitted request signal with the received reply signal is then performed with reference to the individual components forming the modulation scheme, for example, the frequency components. The use, for example, of a modulation scheme of different frequencies for modulating the request signal increases the operation security of the claimed method, in particular, to the effect that a chance phase equalization for an unauthorized path extension can be recognized due to the possibility of an absolute distance measurement of the return radio path. For the use of a frequency scheme, a base frequency is used and mixed expediently with a defined number of other frequencies that are each components of the base frequency divided by two. This can be realized in a simple way with a frequency divider. In this way, the value of the base frequency defines the resolution of the distance measurement and the number of divisions of the maximum detectable distance.

A phase comparison between the originally transmitted request signal and the received reply signal can be realized, for example, through the use of a phase comparator.

In another embodiment of the invention, a modulated carrier wave transmitted over a radio path can be evaluated depending on the length of the return radio path with reference to a change or replacement of the function value of the used modulation variables compared with simultaneous function values of the originally transmitted signal. This method takes advantage of the time-dependent shift of the modulation curve of the reply signal relative to the identical modulation curve of the request signal due to the distance between the base station and ID transmitter.

According to the claimed method, a function value of the modulation variables of the received reply signal at a certain time is compared with the simultaneous function value of the modulation variables of the originally transmitted request signal. Such a comparison is expediently performed by the step of a difference formation of absolute values or also squares of the function values of the modulation variables at a predetermined time. This function value comparison can be performed at quasi-arbitrary positions of the modulation function and thus, continuously.

To increase access security, the frequency of the carrier wave for the request signal is different from that of the corresponding reply signal. It is expedient to transmit the request and/or reply signal on respective paths, on which there occurs an encrypted data dialog between the base station and the ID transmitter, if necessary.

In one configuration of this method, the carrier wave is transmitted frequency modulated, for easier evaluation, preferably linearly frequency-modulated. Correspondingly, the base station has a means for transmitting such a carrier wave as a request signal, as well as an FM demodulator that performs a demodulation of the received reply signal. The mobile ID transmitter has an FM demodulator for demodulating the received request signal. The output of the demodulator is expediently connected to an input of the transceiver for data communication, so that the data signal transmitted from the ID transmitter simultaneously represents or contains the reply signal to the transmitted request signal due to its modulation.

The comparison of a function value of the modulation variables, for example, the modulation frequency of the received reply signal, with the simultaneous function value of the modulation frequency results in a difference frequency. The measurement of this difference frequency is a measure of the length of the return radio path (base station-ID transmitter-base station). Authorization control is expediently performed such that a threshold for the difference frequency is preset, wherein when this threshold is exceeded, the authorization is denied.

Alternative to the use of a frequency-modulated carrier wave, an amplitude-modulated carrier wave or also a frequency and amplitude modulated carrier wave can be used to characterize the request and reply signal.

BRIEF DESCRIPTION OF THE DRAWINGS

FIG. 1, a schematic block circuit diagram of a keyless access authorization control device with a base station and an ID transmitter, FIG. 2, a time sequence diagram for determining the distance between the base station and the ID transmitter of FIG. 1, FIG. 3, a schematic block circuit diagram of an additional keyless access authorization control device containing a base station and an ID transmitter, FIG. 4, a schematic block circuit diagram of another keyless access authorization control device containing a base station and an ID transmitter, FIG. 5, a time sequence diagram for determining the distance between the base station and the ID transmitter corresponding to the embodiments of FIGS. 3 or 4, FIG. 6, a schematic block circuit diagram of a keyless access authorization control device, FIG. 7, a principle sequence schematic for checking the access authorization of a person carrying an ID transmitter, FIG. 8, a schematic block circuit diagram of another keyless access authorization control device, FIG. 9a, a diagram with a base frequency and two additional frequency components, FIG. 9b, a diagram of the amplitude curve resulting from the frequency mixing of FIG. 9a, FIG. 10, a block circuit diagram of a transceiver of a base station, like that for a vehicle, FIG. 11, a schematic block circuit diagram of an ID transmitter, and FIG. 12, a diagram with a linearly frequency-modulated carrier wave distributed over time as the transmitted request signal and the received reply signal shifted in time relative to the request signal.

BEST MODES FOR CARRYING OUT THE INVENTION

Figure 3:
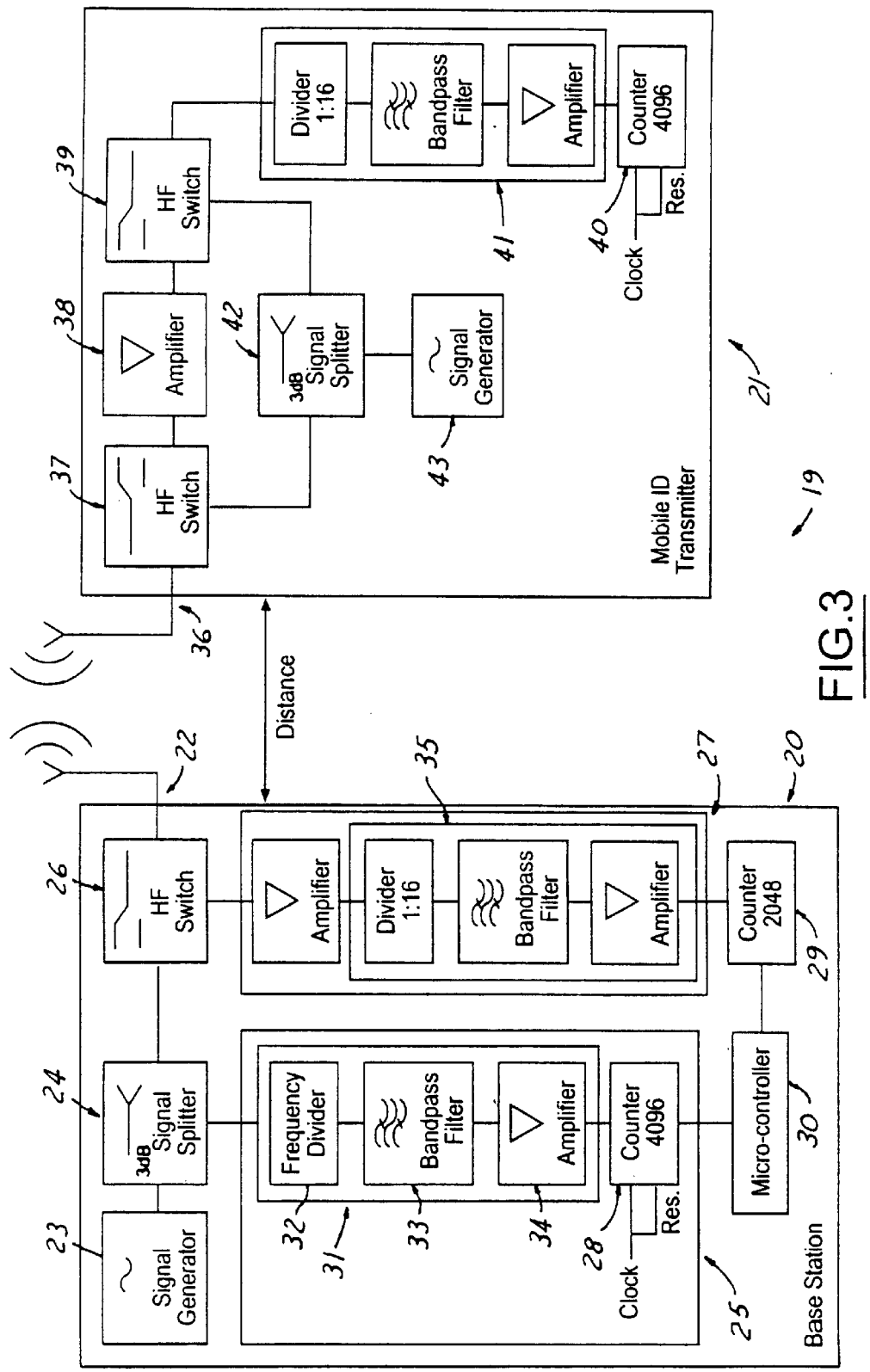

A keyless access authorization control device 1 includes a base station 2 and a mobile identification transmitter (ID transmitter) 3. A transceiver unit 4 with an HF transmitter 5 and an HF receiver 6 that operate at different frequencies belong to the base station 2. The base station is also connected to a microcontroller 7 for controlling the transmission operation and for evaluating the received signals. A cycle counter 8 for counting the cycles of the received carrier wave is connected to the HF receiver 6. The cycle counter 8 has a start input 9 and a stop input 10. The start input 9 is connected to the microcontroller 7. The start signal for starting the cycle counting is transmitted to the cycle counter 8 through the start input. The stop input 10 is connected to an AND-gate 11, the HF receiver 6, and also to the microcontroller 7. After the receipt of a signal by the HF receiver 6, a stop signal for stopping the cycle counting is applied to stop input 10 of the cycle counter 8 when no more signals are received.

The ID transmitter 3 also includes a transceiver unit 12 with an HF transmitter 13 and an HF receiver 14. The HF transmitter 13 operates at the same frequency as the HF receiver 6 of base station 2; the HF receiver 14 of ID transmitter 3 operates at the same frequency as the HF transmitter 5 of base station 2. Thus, the HF path between the base station 2 and the ID transmitter 3 is duplex capable. The HF receiver 14 is connected to a microcontroller 15 for evaluating incoming signals. The microcontroller 15 is connected to the HF transmitter 13 by means of a data line 16 and a key line 17. Parallel to the microcontroller 15, evaluation logic 18 is arranged in the ID transmitter 3 between the HF receiver 14 and the HF transmitter 13. The evaluation logic 18 is used to recognize a code signal transmitted from the base station 2, as well as to control HF transmitter 13 directly; without requiring such a signal to be evaluated by the microcontroller 15 and the HF transmitter 13 to be controlled. Because only a completely defined code signal must be recognized by the evaluation logic 18, the required time for evaluation is constant in contrast to the required processing time of the microcontroller 15. The evaluation logic 18 is connected to the microcontroller 15 for turning the evaluation logic 18 on and off by means of a control line.

The keyless access authorization control device 1 shown in FIG. 1 is used to carry out an encrypted request-reply dialog for determining access authorization and also to determine the current distance of ID transmitter 3 from base station 2. The distance determination between base station 2 and ID transmitter 3 is performed as follows, where reference is made to the sequence diagram of FIG. 2: within a communications telegram in the frame of the stated encrypted authorization control, the command TRANSMITTER ID TRANSMITTER ON is transmitted to ID transmitter 3 by HF transmitter 5 of base station 2 at a predetermined time $t_0$. At time $t_a$, the HF receiver 14 of ID transmitter 3 receives this command. At time $t_b$, the HF transmitter 13 starts to transmit a carrier wave at the frequency $f_1$. The carrier wave transmitted at the frequency $f_1$, is received by HF receiver 6 of the base station at time $t_c$. Upon receipt of the carrier wave, the cycle counter 8 is set to zero. At time $t_1$, a code signal, namely the command TRANSMITTER ID TRANSMITTER OFF, is transmitted by HF transmitter 5, and simultaneously, the cycle counter 8 for counting the cycles received at frequency $f_1$, is started by means of start input 9. The code signal has been transmitted by HF transmitter 5 of base station 2 at frequency $f_2$. After receipt of the code signal by HF receiver 14 of ID transmitter 3 and after recognition of this command by evaluation logic 18, the HF transmitter 13 of ID transmitter 3 is turned off at the time labeled $t_d$ in FIG. 2. Starting at time $t_c$, HF receiver 6 of base station 2 receives the carrier wave transmitted by HF transmitter 13 of ID transmitter 3. After HF transmitter 13 is turned off, HF receiver 6 can no longer receive the carrier wave at time $t_e$. At this time, the cycle counter 8 for determining the count state is also stopped. Now, the detected cycle count state is a measurement of the propagation time of the signal between base station 2 and ID transmitter 3 and back. For calculating the propagation time and the resulting distance, the idle time and also the signal lengths are taken into consideration.

FIG. 3 shows a block circuit diagram of another keyless access authorization control device 19 with a base station 20 and an ID transmitter 21. In this figure, only the components are shown that are necessary to determine the distance between base station 20 and ID transmitter 21. The shown module is partially integrated with conventional hardware in order to realize an encrypted access authorization control. Base station 20 includes an antenna 22 as a transceiver unit for transmitting and receiving signals. These signals are based on a carrier wave. The carrier wave is generated in a signal generator 23 and is then applied to a signal splitter 24. The signal splitter 24 supplies the generated signal, on the one hand, to the antenna 22, and on the other hand, to a first counter circuit 25. HF switch 26 is used to switch the operation of base station 20 between transmission, as shown in FIG. 3, and reception. At the receipt of the code signal returned by ID transmitter 21, the HF switch 26 is set to its other position, in which a second counter circuit 27 is connected to HF switch 26. Both counter circuits 25 and 27 have a counter 28 and 29, respectively. Counters 28, 29 are connected to a microcontroller 30.

The signal generated by the signal generator 23 is a carrier wave at a frequency within an ISM band, namely 434 MHz. To reduce the requirements on the counter 28, a frequency dividing circuit 31, which consists of an actual frequency divider 32 with a dividing ratio of 1:16, a bandpass filter 33 connected to the output of the frequency divider, and an amplifier 34 are connected to the input of the counter. A correspondingly designed frequency circuit 35 is associated with the counter circuit 27.

The ID transmitter 21 also has an antenna 36 as a transceiver unit that is connected at its output to HF switch 37. In receive mode, as shown in FIG. 3, an amplifier 38 and another HF switch 39 is connected to the output of HF switch 37. The received code signal, the carrier wave, is applied to counter 40. A frequency dividing circuit 41 corresponding to frequency dividing circuits 25 and 27 of base station 20 is connected to the input of this counter. Parallel to the amplifier 38, a signal generator 43 is connected by means of a signal splitter 42, whose signals can be transmitted by antenna 36 according to the corresponding positions of HF switches 37, 39

Figure 4:
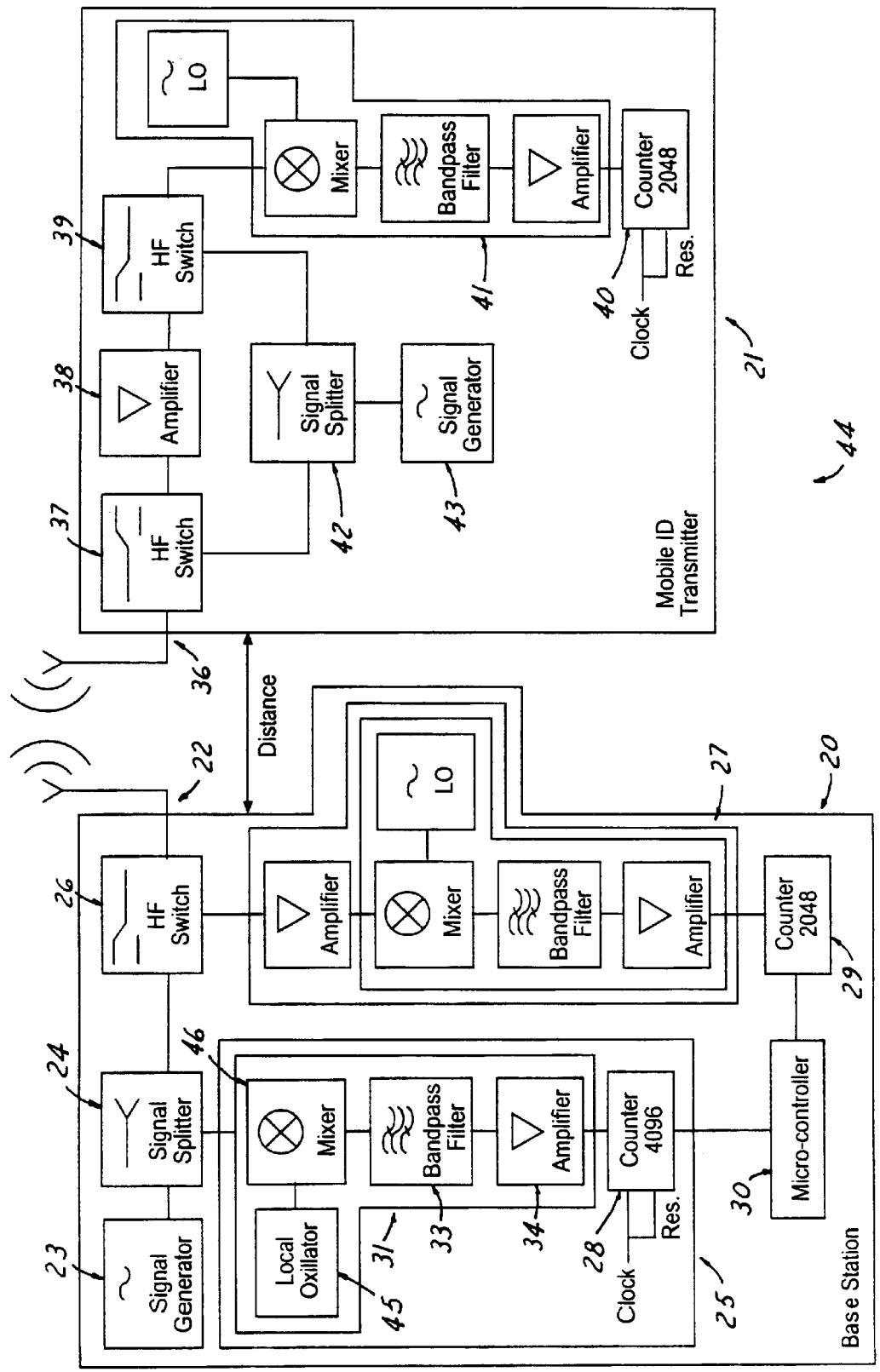

FIG. 4 shows another keyless access authorization control device 44 that is fundamentally designed like the keyless access authorization control device 19 shown in FIG. 3. Identical elements of the two access authorization control devices 19 and 44, respectively, are labeled with the same reference numerals. In contrast to access authorization control device 19, the keyless access authorization control device 44 has a frequency mixer consisting of a local oscillator 45 and a mixer 46 instead of the actual frequency divider 32.

Figure 5:
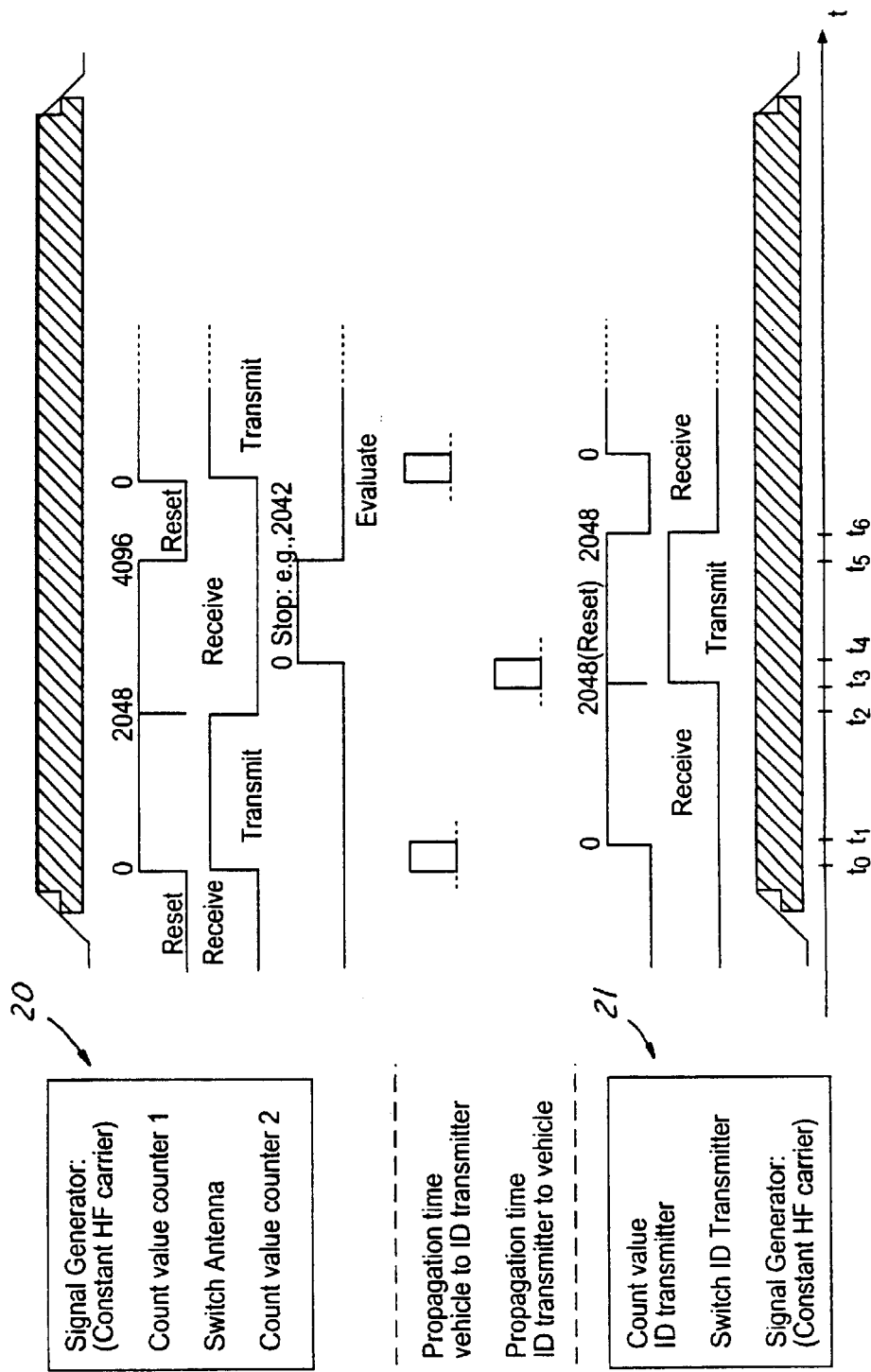

In the following, the function of the keyless access authorization control device 19 is described with reference to determining the distance from the base station 20 to the ID transmitter 21, where reference will also be made to FIG. 5. Corresponding parts also apply to keyless access authorization control device 44 of FIG. 4. A constant HF carrier is generated by signal generator 23. At time $t_0$, the counter 28 is set to 0 and switched to count the cycles of the HF carrier, where HF switch 26 is simultaneously switched to transmission. At time $t_1$, which is shifted from time $t_0$ due to the signal propagation time between the base station 20 and the ID transmitter 21, the HF carrier wave is received by ID transmitter 21. A predetermined number of cycles, namely 2048 cycles, is used as the code signal. At time $t_2$, that is, after transmission of the code signal, the base station is switched to receive by means of HF switch 26, so that further transmission of the HF carrier wave is cut off. At time $t_3$, the count of counter 40 of ID transmitter 21 corresponds to the transmitted number of cycles, namely 2048. At this time, the ID transmitter switches from receive mode to transmit mode, so that the two HF switches 37 and 39 are each in their other positions, which are not shown in FIG. 3. The signal generator 43 of ID transmitter 21 is turned on beforehand so that a constant HF carrier is available for transmission. The frequency of the HF carrier generated by signal generator 43 corresponds to signal generator 23 of base station 20. At this point, the code signal, namely, 2048 cycles of the carrier, is transmitted back by ID transmitter 21 beginning at time $t_3$. According to the signal propagation time, the beginning of the return transmission of the code signal is received shifted in time by base station 20 at time $t_4$. The base station 20 in reception mode leads the returned code signal to the counter circuit 27 so that the returned number of cycles can be counted in counter 29. At time $t_5$, the counter 28 counts twice the number of cycles corresponding to the code signal, namely 4096. At this time, the count status of counter 29 is stopped and read by microcontroller 30. This count status is at first, for example, 2042. The returned code signal is not yet completely received. This "premature" stopping of counter 29 is used to compensate for possibly unrecognized cycles during communication between ID transmitter 21 and base station 20.

The difference between the number of cycles (here: 2048) for the code signal and the number of cycles (here: 2042) determined by counter 29 corresponds to the signal propagation time from the base station 20 to the ID transmitter 21 and back. At time $t_6$, the ID transmitter 21 is switched back to receive mode. At this point there is the possibility of repeating the distance determination or continuing the request protocol.

In order also to compensate for unrecognized cycles during transmission of the code signal from the base station 20 to the ID transmitter 21 and during the subsequent signal processing, instead of transmitting the exact number of cycles, a slightly greater number of cycles can be transmitted. A refinement of the method is especially expedient, wherein delays are inserted between the different modes of the base station 20 or the ID transmitter 21, transmit or receive mode. Without any additional measures, the transmitted code signal can feature such a safeguard that base station 20 is switched to its receive mode before the return of the code signal from ID transmitter 21. The delays can be provided in a simple way so that the used counter 28 or 40 is correspondingly switched, and so that such a delay is measured like the length of the transmitted code signal, in the described embodiment, 2048 cycles long. During later evaluation, such designed delays are taken into consideration.

Through the doubled propagation time represented in the embodiment, the resolving power with reference to the distance between the base station and the ID transmitter can be determined with accuracy that is greater than distance determination merely through detection of simple signal propagation time. This accuracy can be further increased by performing the distance determination not once but many times, and also at different positions within a transmission protocol. Detection of the actual distance is then done, for example, by averaging the individual detected distances.

From the description of this embodiment, it is clear that distance determination between a base station and an ID transmitter is possible due to the reliable accuracy corresponding to the resolving power, so that in this way a reliable recognition of unauthorized path extension is possible. To increase operation security, different code signals can be used. A preprogramming of the ID transmitter, for example, through a predetermined number of cycles as the code signal is also possible.

Keyless access authorization control device 47 includes a base station B with a transceiver unit 48. The keyless access authorization control device 47 is used to check access authorization to a vehicle. Thus, base station B is ardistanced in a vehicle. Access authorization control device 47 is also associated with a mobile ID transmitter ID that is carried by the person authorized to use the vehicle.

The transceiver unit 48 includes a transceiver 49 for transmitting a request signal at a high-frequency radio path as well as one or more transmitters 50 for transmitting the low-frequency radio signal. The transceiver 49 is connected to a processor 51 that controls the transmit-receive actions of the transceiver 49. A phase comparator 52 is connected to the output of transceiver 49. The other input of the phase comparator is connected to the low-frequency reference signal 53. The output of PLL circuit 52 is applied to an input of processor 51. However, to realize the method according to the invention, it is sufficient to use a receiver instead of transceiver 49.

ID transmitter ID essentially consists of a processor 54 and a transceiver 55 that is connected to LF antenna 56.

Figure 7:
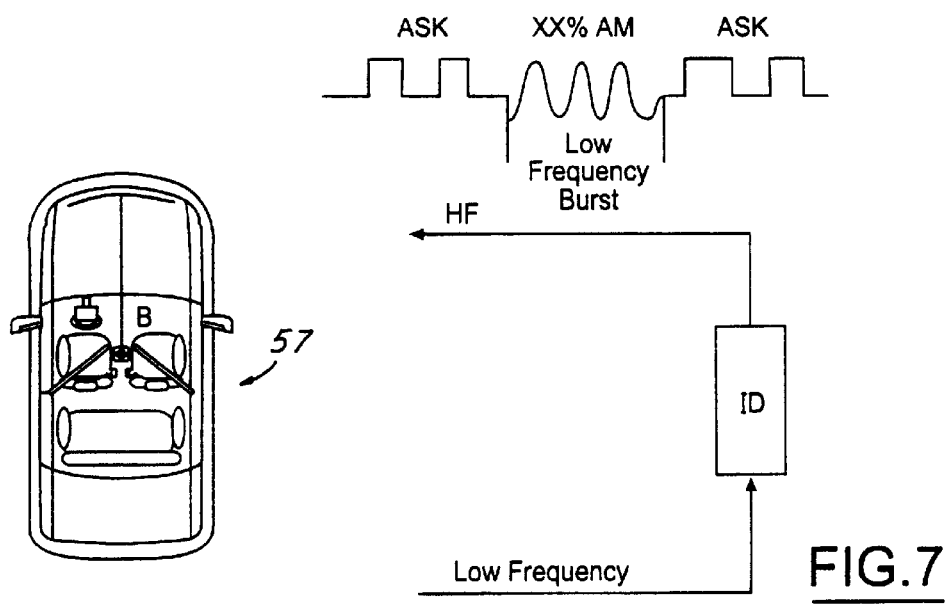

During the operation of the access authorization control device 47, a request signal is transmitted in cycles by transceiver unit 48 in vehicle 57 on an LF channel, as shown schematically in FIG. 7. The transmission power for transmitting this signal is set so that this signal can be received by ID transmitter ID within a circle of approximately 3 m around the vehicle 57. If the ID transmitter ID is within the reception area of this LF request signal, the transmitter is activated by this signal and switched to its active state. If ID transmitter ID is ready, it transmits a reply data telegram in ASK mode (amplitude shift keying mode) on an HF channel. At a predetermined position within this data telegram, the modulation type of the ID transmitter is changed from ASK modulation to pure amplitude modulation. The amplitude modulation of the carrier wave used to transmit the reply signal is performed with the request signal received on the LF channel by the ID transmitter ID. The time and the period of this amplitude-modulated reply signal is agreed upon between base station B and ID transmitter ID and can be changed according to a defined algorithm for increasing the operation security. If this amplitude-modulated carrier wave has been transmitted for the predetermined period by ID transmitter ID, its operating mode changes again to ASK modulation for data transmission. From this principle representation it is clear that a full-duplex operation can be realized over time with the operation of access authorization control device 47.

The reply signal transmitted from ID transmitter ID is received by transceiver 49 of base station B. The analog part of the received data telegram, namely the amplitude-modulated component, is applied to the PLL circuit 57 and its phase is compared with the phase of the originally transmitted request signal. If ID transmitter ID is within the operating area, both phases are recognized by the phase comparator 52 within a predetermined tolerance as constant relative to each other if there are no other intermediate relay stations. It is clear that in this method, a comparison of phases on relative paths is performed without determining the respective absolute phases.

Figure 6:
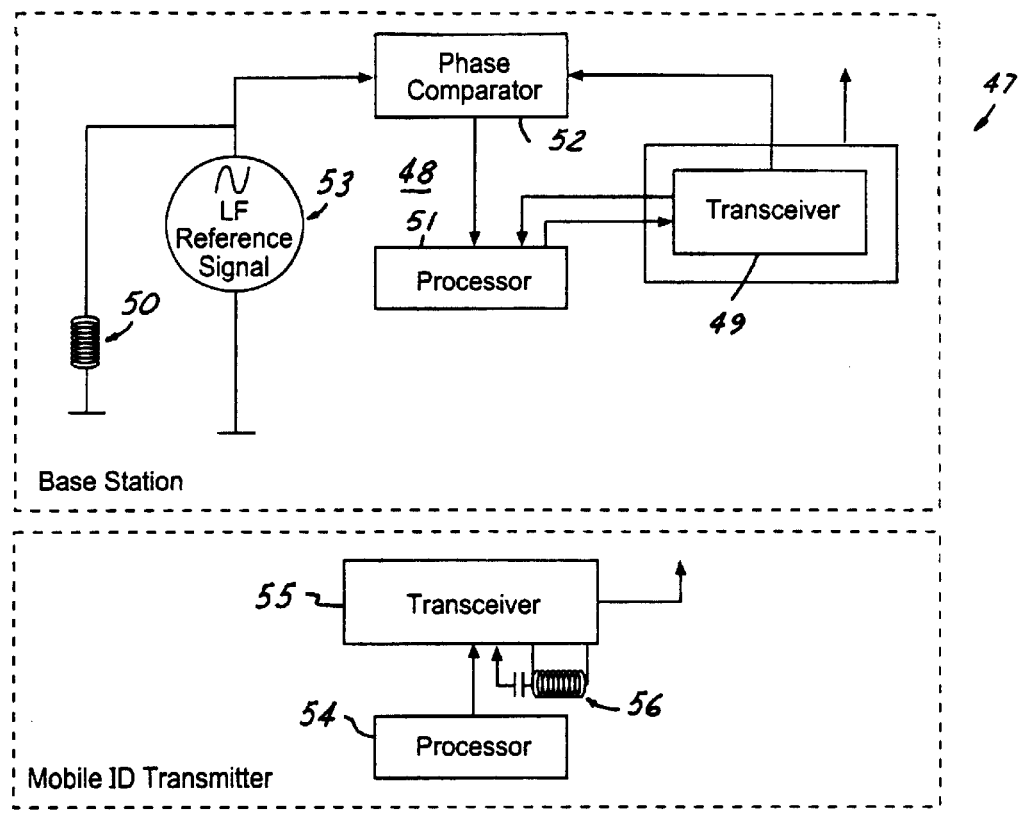

LF oscillator 53 is operated free-running in the embodiment shown in FIG. 6 so that its natural frequency deviations can be correspondingly recovered also in the demodulated reply signal. Through these measures, the operational security of access authorization control device 47 is further increased against manipulation.

Figure 8:
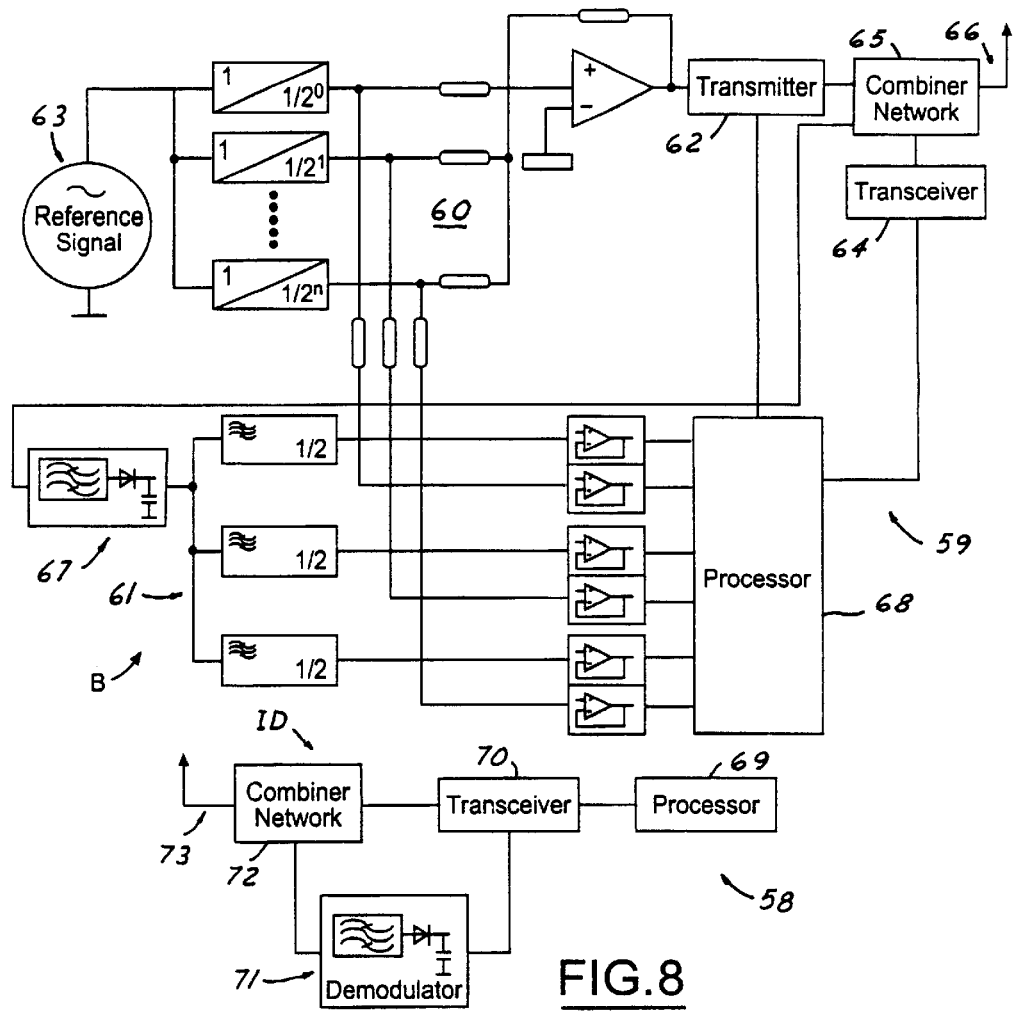

Another access authorization control device 58 is reproduced schematically in FIG. 8 in a block circuit diagram. Base station B of this access authorization control device 58 essentially consists of a transceiver 59, a modulation unit 60 for producing frequency mixing for modulating the carrier wave of a request signal, and a phase comparator 61 for corresponding filtering of the carrier wave modulated with the modulation scheme on a reply channel. The transceiver unit 59 includes HF transmitter 62 for transmitting the carrier wave modulated with a modulation scheme, transceiver 64, wherein the transmitter 62 and the transceiver 64 are connected to a common transmit-receive antenna 66 by means of a combiner network 65. A reference signal 63 is also associated with the transceiver 59. A demodulator 67 is also connected to the combiner network 65 for demodulating a received reply signal. At its output, the demodulator 67 is connected to the phase comparator 61. There is a processor 68 for controlling the transmit-receive processes of transceiver 64 and transmitter 62.

A mobile ID transmitter ID belongs to access authorization control device 58 and is carried by the person authorized to use the vehicle. The ID transmitter essentially consists of a processor 69, a transceiver 70, a demodulator 71, a combiner network 72, and a transmit-receive antenna 73. Request signals transmitted by the transceiver unit 59 of base station B can be received with the transmit-receive antenna 73 and demodulated by demodulator 26. At its output, demodulator 71 is connected to an input of transceiver 70 so that the demodulated request signal can be used to modulate the reply signal.

A frequency scheme is supplied by modulation unit 60. A carrier wave for transmitting a request signal is modulated with this frequency scheme. The modulation frequency scheme consists of a base frequency and several other frequency components that are each components of the base frequency divided by two. Such a frequency scheme representing the request signal is reproduced in a diagram in FIG. 9a. The variation of the amplitude curve of this frequency scheme is shown in FIG. 9b.

With this modulation frequency scheme, a carrier wave on an HF channel of, for example, 433 MHz, is modulated and transmitted by means of transmit-receive antenna 66. If ID transmitter ID is within a predetermined distance to the vehicle, this signal will be received and demodulated by means of demodulator 71. The returned reply signal of ID transmitter ID is performed by modulation of a carrier wave of, for example, 868 MHz, in transceiver 70 with the demodulated request signal and thus, with the original frequency scheme used to modulate the request signal. This reply signal is transmitted by the ID transmitter and received by the transceiver 59, demodulated and then filtered in phase comparator 61. A diode detector is provided as demodulator 67. The corner frequencies of the filter contained in phase comparator 61 correspond to the base frequency and to the other frequency components. Through a phase comparison of equal frequency components, the distance of ID transmitter ID from base station B can be calculated. Depending on the determined distance, there can be a direct decision on the return radio path of the request and reply signal, allowing the detection of whether the reply signal has been transmitted directly from ID transmitter ID or whether there is the receipt of a reply signal from an intermediate circuit of an unauthorized path extension.

The distance measurement in this embodiment can also be used to make it easier to find a vehicle parked, for example, in a parking garage. In this case, the transmission of the request signal by the base station B must be triggered by ID transmitter ID. Correspondingly, the user can be informed whether he is getting nearer or farther from his vehicle.

In the following, another embodiment of the invention is described with reference to FIGS. 10–12. A transceiver unit 74 of the base station is associated with the vehicle that is not shown in greater detail. This transceiver unit is used to carry out keyless access authorization control. Transceiver unit 74 essentially consists of a processor 75, a transceiver 76 for data communication with a mobile ID transmitter, a combiner network 77, and a transmit-receive antenna 78 connected to this network 77. Data communication with the ID transmitter is performed, for example, at 868 MHz. This data communication includes request-reply dialogs that are used to deduce the authorization of the person carrying this ID transmitter to open the vehicle depending on a received reply code of the ID transmitter. To perform the method according to the invention, all that is necessary is for the base station to have a receiver, instead of the transceiver 76 shown in the figures, for receiving the reply signal transmitted from the ID transmitter.

Transceiver unit 74 also includes a transmitter 79 that operates at 433 MHz in the described embodiment. The output of transmitter 79 is applied to combiner network 77, so that transceiver antenna 78 is used both by transceiver 76 and also by transmitter 79. Transmitter 79 is used to transmit a linearly frequency-modulated carrier wave as a request signal that can be used to calculate the distance of the ID transmitter returning this request signal after the request signal is received as a reply signal.

An FM demodulator 80 is also connected to the combiner network 77. The frequency-modulated reply signal received by the transmit-receive antenna 78 is demodulated by this demodulator. The output of demodulator 80 is connected to processor 75, so that a comparison of the received, demodulated reply signal with the first transmitted modulated request signal is possible through processor 75.

An ID transmitter not shown in greater detail includes, as shown in FIG. 11, a processor 81 and a transceiver 82 for data communication. The output of transceiver 82 is connected to the input of a combiner network 83. A transmit-receive antenna 85 is also connected to this network 83. In addition, the output of an FM demodulator 84 is connected to network 83. This demodulator is used to demodulate a request signal transmitted by transceiver unit 74. The output of FM demodulator 84 is connected to an input of transceiver 82. In this way, the request signal demodulated by FM demodulator 84 is used directly for modulating transceiver 82. The reply signal returned by the ID transmitter is then part of the otherwise occurring data communication.

To determine the distance of the ID transmitter from the vehicle or from transceiver unit 74, the transceiver unit 74 transmits a request signal in the form of a linearly frequency-modulated carrier wave (433 MHz) through the transmitter 79. The use of a linearly frequency-modulated carrier wave is advantageous for later evaluation. When the ID transmitter is at a defined distance to the transceiver unit 74, this request signal is received, demodulated, and used to modulate transceiver 82 of the ID transmitter. The reply signal returned on the 868 MHz channel from the ID transmitter is received by transceiver 74 and demodulated in demodulator 80. Due to the return radio path there is a time delay between the linearly frequency-modulated carrier wave of the request signal and the corresponding reply signal. This time delay results from the return radio path—the longer the return radio path, the longer the delay. Thus, an undesired path extension can be recognized from a relatively large time delay between the modulation frequency function of the request signal and the corresponding reply signal.

Figure 12:
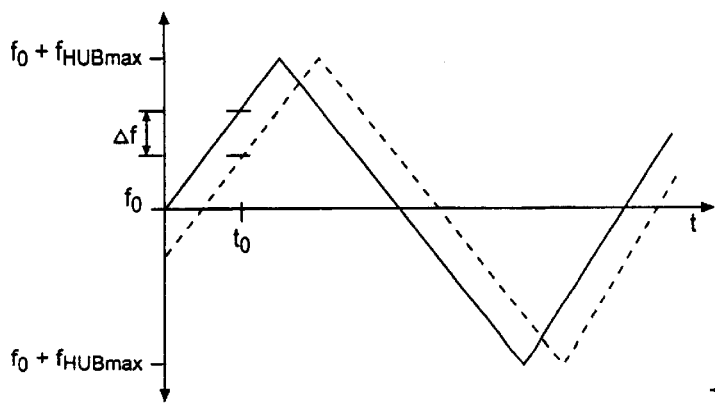

A diagram of a linearly frequency-modulated carrier wave is reproduced in FIG. 12 (the modulation curve is indicated by the continuous line), where time is on the x-axis and frequency on the y-axis. The maximum ($f_0+f_{HUBmax}$) and the minimum ($f_0-f_{HUBmax}$) of this frequency curve represents the frequency swing used to modulate the carrier wave ($f_0$). The reply signal reflected from the ID transmitter and received and demodulated by transceiver 74 is indicated by the dashed line, with the corresponding time delay reflecting the return radio path. A comparison of the function value of the carrier frequency curve of the request signal with the corresponding value of the reply signal at time $t_0$ can be done by subtracting the absolute values of the two function values or also by subtracting the two squared function values. Such a comparison step can be realized with minimal hardware expense or also in software through processor 75. If the difference frequency ($\Delta f$) calculated in this way exceeds a certain value, it means that the return radio path (transceiver unit 74-ID transmitter-transceiver unit 74) is longer than a predetermined functional area that has been set, for example, to be 5–10 m around the transceiver unit 74. Thus, the ID transmitter is not in the vicinity of the vehicle; obviously, the radio path has been manipulated and lengthened. In this case, access authorization is denied. If the difference frequency ($\Delta f$) is within the tolerated interval, the ID transmitter is in the functional area, and hence the desired action is performed: the vehicle doors are unlocked.

The resolution of this method relative to the return radio path is defined by the selection of modulation frequency or by the frequency swing. By varying the modulation frequency, the repetition of the measurement values at regular distances (every 360°) can be prevented. The lowest frequency can be considered as the value for the maximum distance to be measured; the highest frequency in the frequency scheme defines the resolution of the system.

Summary of Reference Numerals

1 Keyless access authorization control device
2 Base station
3 ID transmitter
4 Transceiver unit
5 HF transmitter
6 HF receiver
7 Microcontroller
8 Cycle counter
9 Start input
10 Stop input
11 AND-gate
12 Transceiver unit
13 HF transmitter
14 HF receiver
15 Microcontroller
16 Data line
17 Key line
18 Evaluation logic
19 Keyless access authorization control device
20 Base station
21 ID transmitter
22 Transmit-receive antenna
23 Signal generator
24 Signal splitter
25 Counter circuit
26 HF circuit
27 Counter circuit
28 Counter
29 Counter
30 Microcontroller
31 Frequency dividing circuit
32 Frequency divider
33 Bandpass filter
34 Amplifier
35 Frequency dividing circuit
36 Transmit-receive antenna
37 HF circuit
38 Amplifier
39 HF circuit
40 Counter
41 Frequency dividing circuit
42 Signal splitter
43 Signal generator
44 Keyless access authorization control device
45 Local oscillator
46 Mixer
47 Keyless access authorization control device
48 Transceiver unit
49 Transceiver
50 NF transmitter
51 Processor
52 PLL circuit
53 Frequency generator
54 Processor
55 Transceiver unit
56 NF antenna
57 Vehicle
58 Keyless access authorization control device
59 Transceiver unit
60 Modulation unit
61 Phase comparator
62 HF transmitter 63 Reference signal
64 Transceiver
65 Combiner network
66 Transmit-receive antenna
67 Demodulator, diode detector
68 Processor
69 Processor
70 Transceiver
71 Demodulator
72 Combiner network
73 Transmit-receive antenna
B Base station
ID ID transmitter
74 Transmit-receive unit
75 Processor
76 Transceiver
77 Combiner network
78 Transmit-receive antenna
79 Transmitter
80 FM demodulator
81 Processor
82 Transceiver
83 Combiner network
84 FM demodulator
85 Transmit-receive antenna

What is claimed is:

1. A method for checking keyless access authorization of an operator, the method comprising:

(I) transmitting a code signal from a base station to a mobile identification (ID) transmitter carried by the operator;

(II) receiving the code signal from the base station with the ID transmitter;

(III) performing an action with the ID transmitter in response to the ID transmitter receiving the code signal, wherein the action is indicative of a reply signal that is detectable by the base station;

(IV) detecting the reply signal with the base station;

(V) determining the difference of a signal characteristic between a reference code signal monitored at the base station and the reply signal received by the base station, wherein the signal characteristic correlates with signal propagation time and changes as a function of the distance between the base station and the ID transmitter; and (VI) determining distance between the base station and the ID transmitter on the basis of a relative determination based on the difference of the signal characteristic between the reference code signal monitored at the base station and the reply signal received by the base station.

2. The method of claim 1 wherein:

step (I) includes transmitting a code signal from the base station to the ID transmitter until the reply signal is detected by the base station;

step (V) includes counting cycles of the code signal while the code signal is being transmitted from the base station to the ID transmitter; and step (VI) includes determining the distance between the base station and the ID transmitter based on the counted cycles of the code signal transmitted from the base station to the ID transmitter.

3. The method of claim 2 wherein:

step (I) includes transmitting a second code signal from the base station to the ID transmitter after the reply signal has been detected by the base station;

step (III) includes transmitting a reply signal from the ID transmitter to the base station until the second code signal from the base station is received by the ID transmitter;

step (V) includes counting cycles of the reply signal while the reply signal is being transmitted by the ID transmitter to the base station; and step (VI) includes determining the distance between the ID transmitter and the base station based on the counted cycles of the reply signal transmitted by the ID transmitter to the base station.

4. The method of claim 2 wherein:

the reply signal detected by the base station is the code signal transmitted by the base station to the ID transmitter;

step (V) includes counting cycles of the code signal transmitted from the base station to the ID transmitter until the code signal has been detected by the base station; and step (VI) includes determining the distance between the ID transmitter and the base station based on the counted cycles of the code signal transmitted by the base station to the ID transmitter.

5. The method of claim 4 wherein:

step (I) includes transmitting a carrier wave code signal having a predetermined number of cycles from the base station to the ID transmitter.

6. The method of claim 2 wherein:

the reply signal detected by the base station is the code signal transmitted by the base station to the ID transmitter;

step (V) includes counting a first set of cycles of the code signal as the code signal is being transmitted by the base station to the ID transmitter and then counting a second set of cycles of the code signal as the code signal is being detected by the base station until the first set of counted cycles is equal to twice the second set of counted cycles.

7. The method of claim 2 wherein:

step (V) includes counting only every $2^x$th cycle of the code signal while the code signal is being transmitted from the base station to the ID transmitter.

8. The method of claim 1 wherein:

step (I) includes transmitting a code signal with modulation instructions from the base station to the ID transmitter;

step (III) includes transmitting a modulated carrier wave reply signal modulated in accordance with the modulation instructions of the code signal transmitted from the ID transmitter to the base station;

step (V) includes comparing the phase of the demodulated carrier wave reply signal with the phase of the code signal.

9. The method of claim 8 wherein:

the carrier wave of the reply signal is amplitude-modulated.

10. The method of claim 8 wherein:

step (I) includes transmitting a code signal at a frequency used to modulate the reply signal.

11. The method of claim 10 wherein:

step (I) includes transmitting a code signal at a low frequency from the base station to the ID transmitter; and step (III) includes transmitting a modulated carrier wave reply signal amplitude-modulated with the code signal transmitted from the ID transmitter to the base station.

12. The method of claim 10 wherein:
step (I) includes transmitting a code signal at different frequencies during transmission from the base station to the ID transmitter.

13. The method of claim 8 wherein:
step (I) includes transmitting a code signal with coding from the base station to the ID transmitter.

14. The method of claim 8 wherein:
step (I) includes transmitting a code signal modulated with a modulation scheme formed from at least one modulation variable from the base station to the ID transmitter; and
step (III) includes transmitting a reply signal modulated in accordance with the modulation scheme from the ID transmitter to the base station.

15. The method of claim 14 wherein:
the modulation scheme is a frequency scheme having individual frequency components; and
step (V) includes comparing the phase of code signal with the reply signal is performed with reference to individual frequency components forming the modulation scheme.

16. The method of claim 1 wherein:
step (I) includes transmitting a modulated carrier wave code signal from the base station to the ID transmitter;
step (III) includes transmitting a reply signal modulated in accordance with the modulated carrier wave code signal from the ID transmitter to the base station;
step (V) includes comparing modulation function value of modulation variables of the reply signal with modulation function value of modulation variables of the code signal; and
step (VI) includes determining distance between the base station and the ID transmitter based on the comparison of the modulation function values.

17. The method of claim 16 wherein:
step (V) includes performing a difference formation of absolute values of simultaneous modulation function values.

18. The method of claim 16 wherein:
step (V) includes performing a determination depending on the calculated comparison value ($\Delta f$) in a subsequent step, wherein the determination is whether the ID transmitter is within a predetermined receive area relative to the base station.

19. The method of claim 16 wherein:
the frequency of the carrier wave of the code signal transmitted from the base station to the ID transmitter is different than the frequency of the carrier wave of the reply signal transmitted from the ID transmitter to the base station.

20. The method of claim 16 wherein:
the modulated carrier wave code signal transmitted from the base station to the ID transmitter is linearly-frequency modulated.

21. The method of claim 20 wherein:
step (III) includes transmitting a modulated carrier wave reply signal modulated in accordance with the modulated carrier wave code signal from the ID transmitter to the base station.

22. The method of claim 16 wherein:
the modulated carrier wave signal transmitted from the base station to the ID transmitter is amplitude-modulated.

23. The method of claim 1 wherein:
the base station is associated with a vehicle.

24. A device for checking keyless access authorization of an operator, the device comprising:
a base station having a processor and a transceiver for transmitting a code signal and receiving a reply signal;
a mobile identification (ID) transmitter carried by the operator for transmitting a reply signal to the base station in response to receiving a code signal from the base station;
wherein the processor of the base station determines the difference of a signal characteristic between a reference code signal monitored by the processor and the reply signal received by the base station, the signal characteristic correlates with signal propagation time and changes as a function of the distance between the base station and the ID transmitter;
wherein the processor determines distance between the base station and the ID transmitter on the basis of a relative determination based on the difference of the signal characteristic between the reference code signal monitored at the base station and the reply signal received by the base station.

25. A method for checking access authorization of an operator, the method comprising:
(I) transmitting a code signal from a base station to a mobile identification (ID) transmitter carried by the operator;
(II) receiving the code signal from the base station with the ID transmitter;
(III) performing an action with the ID transmitter in response to the ID transmitter receiving the code signal, wherein the action is indicative of a reply signal that is detectable by the base station;
(IV) detecting the reply signal with the base station;
(V) determining the difference of a distance-dependent signal characteristic correlated with signal propagation time between a reference code signal monitored at the base station and the reply signal; and
(VI) determining distance between the base station and the operator based on the difference of the distance-dependent signal characteristic correlated with signal propagation time between the reference code signal monitored at the base station and the reply signal;
wherein,
step (I) includes transmitting a code signal from the base station to the ID transmitter until the reply signal is detected by the base station;
step (V) includes counting cycles of the code signal while the code signal is being transmitted from the base station to the ID transmitter; and
step (VI) includes determining the distance between the base station and the operator based on the counted cycles of the code signal transmitted from the base station to the ID transmitter;
wherein,
step (I) further includes transmitting a second code signal from the base station to the ID transmitter after the reply signal has been detected by the base station;
step (III) includes transmitting the reply signal from the ID transmitter to the base station until the second code signal from the base station is received by the ID transmitter;
step (V) includes counting cycles of the reply signal while the reply signal is being transmitted by the ID transmitter to the base station; and step (VI) includes determining the distance between the operator and the base station based on the counted cycles of the reply signal transmitted by the ID transmitter to the base station.

26. A method for checking access authorization of an operator, the method comprising:

(I) transmitting a code signal from a base station to a mobile identification (ID) transmitter carried by the operator;

(II) receiving the code signal from the base station with the ID transmitter;

(III) performing an action with the ID transmitter in response to the ID transmitter receiving the code signal, wherein the action is indicative of a reply signal that is detectable by the base station;

(IV) detecting the reply signal with the base station;

(V) determining the difference of a distance-dependent signal characteristic correlated with signal propagation time between a reference code signal monitored at the base station and the reply signal; and (VI) determining distance between the base station and the operator based on the difference of the distance-dependent signal characteristic correlated with signal propagation time between the reference code signal monitored at the base station and the reply signal;

wherein, step (I) includes transmitting a code signal from the base station to the ID transmitter until the reply signal is detected by the base station;

step (V) includes counting cycles of the code signal while the code signal is being transmitted from the base station to the ID transmitter; and step (VI) includes determining the distance between the base station and the operator based on the counted cycles of the code signal transmitted from the base station to the ID transmitter;

wherein the reply signal detected by the base station is the code signal transmitted by the base station to the ID transmitter, and step (V) includes counting a first set of cycles of the code signal as the code signal is being transmitted by the base station to the ID transmitter and then counting a second set of cycles of the code signal as the code signal is being detected by the base station until the first set of counted cycles is equal to twice the second set of counted cycles.

* * * * *